(12) United States Patent
Courtney

(10) Patent No.: US 7,200,548 B2
(45) Date of Patent: Apr. 3, 2007

(54) SYSTEM AND METHOD FOR MODELING A NETWORK DEVICE'S CONFIGURATION

(75) Inventor: Mike Courtney, Colorado Springs, CO (US)

(73) Assignee: Intelliden, Colorado Springs, CO (US)

( * ) Notice: Subject to any disclaimer, the term of this patent is extended or adjusted under 35 U.S.C. 154(b) by 809 days.

(21) Appl. No.: 09/942,833

(22) Filed: Aug. 29, 2001

(65) Prior Publication Data

US 2003/0046370 A1 Mar. 6, 2003

(51) Int. Cl.
G06F 9/455 (2006.01)
G06F 9/46 (2006.01)
H04L 29/06 (2006.01)

(52) U.S. Cl. .......... 703/27; 703/21; 709/223; 717/109

(58) Field of Classification Search .......... 703/27, 703/26, 21; 709/223; 370/401; 717/109; 719/326

See application file for complete search history.

(56) References Cited

U.S. PATENT DOCUMENTS

| | | | |
|---|---|---|---|
| 4,991,089 A | 2/1991 | Shorter | |
| 5,109,486 A | 4/1992 | Seymour | |
| 5,159,685 A | 10/1992 | Kung | |
| 5,442,791 A | 8/1995 | Wrabetz et al. | |
| 5,475,819 A | 12/1995 | Miller et al. | |
| 5,491,820 A | 2/1996 | Belove et al. | |
| 5,519,704 A | 5/1996 | Farinacci et al. | |
| 5,557,748 A | 9/1996 | Norris | |
| 5,581,764 A | 12/1996 | Fitzgerald et al. | |
| 5,724,509 A | 3/1998 | Starkweather et al. | |
| 5,726,883 A | 3/1998 | Levine et al. | |
| 5,751,967 A | 5/1998 | Raab et al. | |
| 5,764,955 A | 6/1998 | Doolan | |
| 5,784,702 A | 7/1998 | Greenstein et al. | |
| 5,787,246 A | 7/1998 | Lichtman et al. | |
| 5,796,732 A | 8/1998 | Mazzola et al. | |
| 5,819,028 A | 10/1998 | Manghirmalani et al. | |
| 5,832,503 A | 11/1998 | Malik et al. | |
| 5,838,918 A | 11/1998 | Prager et al. | |
| 5,842,040 A | 11/1998 | Hughes et al. | |
| 5,852,740 A | 12/1998 | Estes | |

(Continued)

FOREIGN PATENT DOCUMENTS

EP 0 384 339 A2 8/1990

(Continued)

OTHER PUBLICATIONS

Managing Managed Network Services: The Service Provider Blind Spot; Infonetics Research, The Networking Information Source; Jun. 2000 (18 pages).

(Continued)

*Primary Examiner*—Thai Phan
(74) *Attorney, Agent, or Firm*—Cooley Godward Kronish LLP

(57) ABSTRACT

A system and method for modeling the configuration of a network device is described. Such a system could include, for example, a CLI-to-XML converter connected to a schema storage device or a CLI-to-XML converter in combination with document object model (DOM) generator. Other embodiments could include a CLI-to-XML converter, a schema hash system, and a DOM generator.

18 Claims, 7 Drawing Sheets

U.S. PATENT DOCUMENTS

| | | | |
|---|---|---|---|
| 5,872,928 A | 2/1999 | Lewis et al. | |
| 5,884,028 A | 3/1999 | Kindell et al. | |
| 5,889,953 A | 3/1999 | Thebaut et al. | |
| 5,920,701 A | 7/1999 | Miller et al. | |
| 5,944,782 A | 8/1999 | Noble et al. | |
| 5,948,065 A | 9/1999 | Eilert et al. | |
| 5,956,341 A | 9/1999 | Galand et al. | |
| 5,961,594 A | 10/1999 | Bouvier et al. | |
| 5,968,122 A | 10/1999 | Schlosser et al. | |
| 5,968,176 A | 10/1999 | Nessett et al. | |
| 5,974,236 A | 10/1999 | Sherman | |
| 5,980,078 A | 11/1999 | Krivoshein et al. | |
| 6,006,035 A | 12/1999 | Nabahi | |
| 6,016,306 A | 1/2000 | Le Boudec et al. | |
| 6,023,586 A | 2/2000 | Gaisford et al. | |
| 6,028,846 A | 2/2000 | Cain | |
| 6,041,347 A | 3/2000 | Harsham et al. | |
| 6,049,828 A | 4/2000 | Dev et al. | |
| 6,055,568 A | 4/2000 | Adams | |
| 6,097,697 A | 8/2000 | Yao et al. | |
| 6,098,094 A | 8/2000 | Barnhouse et al. | |
| 6,098,101 A | 8/2000 | Sears | |
| 6,098,108 A | 8/2000 | Sridhar et al. | |
| 6,101,508 A | 8/2000 | Wolff | |
| 6,104,700 A | 8/2000 | Haddock et al. | |
| 6,105,069 A | 8/2000 | Franklin et al. | |
| 6,108,699 A | 8/2000 | Moiin | |
| 6,108,703 A | 8/2000 | Leighton et al. | |
| 6,122,664 A | 9/2000 | Boukobza et al. | |
| 6,128,729 A | 10/2000 | Kimball et al. | |
| 6,131,118 A | 10/2000 | Stupek, Jr. et al. | |
| 6,131,119 A | 10/2000 | Fujui | |
| 6,154,776 A | 11/2000 | Martin | |
| 6,167,445 A | 12/2000 | Gai et al. | |
| 6,170,009 B1 | 1/2001 | Mandal et al. | |
| 6,170,011 B1 | 1/2001 | Macleod Beck et al. | |
| 6,182,094 B1 | 1/2001 | Humpleman et al. | |
| 6,198,479 B1 | 3/2001 | Humpleman et al. | |
| 6,202,090 B1 | 3/2001 | Simone | |
| 6,243,747 B1 | 6/2001 | Lewis et al. | |
| 6,260,072 B1 | 7/2001 | Rodriguez-Moral | |
| 6,269,398 B1 | 7/2001 | Leong et al. | |
| 6,292,889 B1 | 9/2001 | Fitzgerald et al. | |
| 6,349,306 B1 | 2/2002 | Malik et al. | |
| 6,356,955 B1 | 3/2002 | Hollberg et al. | |
| 6,363,411 B1 | 3/2002 | Dugan et al. | |
| 6,370,119 B1 | 4/2002 | Basso et al. | |
| 6,381,631 B1 | 4/2002 | Van Hoff | |
| 6,393,425 B1 | 5/2002 | Kelly | |
| 6,418,468 B1 | 7/2002 | Ahlstrom et al. | |
| 6,438,594 B1 | 8/2002 | Bowman-Amuah | |
| 6,442,608 B1 | 8/2002 | Knight et al. | |
| 6,449,638 B1 | 9/2002 | Wecker et al. | |
| 6,463,583 B1 | 10/2002 | Hammond | |
| 6,496,843 B1 | 12/2002 | Getchius et al. | |
| 6,539,425 B1 | 3/2003 | Stevens et al. | |
| 6,550,060 B1 | 4/2003 | Hammond | |
| 6,567,406 B1 | 5/2003 | Skemer | |
| 6,609,108 B1 | 8/2003 | Pulliam et al. | |
| 6,615,166 B1 | 9/2003 | Guheen et al. | |
| 6,625,590 B1 | 9/2003 | Chen et al. | |
| 6,636,877 B1 | 10/2003 | Doleac et al. | |
| 6,654,799 B1 | 11/2003 | Tanaka | |
| 6,658,526 B2 | 12/2003 | Nguyen et al. | |
| 6,678,827 B1 | 1/2004 | Rothermel et al. | |
| 6,684,244 B1 | 1/2004 | Goldman et al. | |
| 6,725,233 B2* | 4/2004 | Froyd et al. | 707/103 R |
| 6,769,116 B1 | 7/2004 | Sexton | |
| 6,775,698 B1 | 8/2004 | Simone | |
| 6,826,597 B1 | 11/2004 | Lonnroth et al. | |
| 2002/0032769 A1* | 3/2002 | Barkai et al. | 709/224 |
| 2002/0038320 A1* | 3/2002 | Brook | 707/513 |
| 2002/0051080 A1 | 5/2002 | Tanaka | |
| 2002/0171762 A1 | 11/2002 | Maxson et al. | |
| 2002/0174091 A1* | 11/2002 | Froyd et al. | 707/1 |
| 2002/0191619 A1* | 12/2002 | Shafer | 370/401 |
| 2002/0198974 A1* | 12/2002 | Shafer | 709/223 |
| 2003/0018765 A1* | 1/2003 | Muhlestein et al. | 709/223 |
| 2003/0033589 A1* | 2/2003 | Reyna et al. | 717/109 |
| 2003/0037040 A1 | 2/2003 | Beadles et al | |
| 2003/0048287 A1* | 3/2003 | Little et al. | 345/705 |
| 2003/0135508 A1 | 7/2003 | Chorafakis et al. | |
| 2004/0078695 A1 | 4/2004 | Bowers et al. | |
| 2004/0225865 A1 | 11/2004 | Cox et al. | |

FOREIGN PATENT DOCUMENTS

| | | |
|---|---|---|
| EP | 0 810 755 A2 | 12/1997 |
| EP | 0 762 281 A3 | 3/1999 |
| EP | 0 973 296 A2 | 1/2000 |
| EP | 0 993 725 A1 | 4/2000 |
| EP | 1 011 230 A2 | 6/2000 |
| EP | 1 012 726 A1 | 6/2000 |
| EP | 1 026 867 A2 | 8/2000 |
| EP | 1 047 226 A2 | 10/2000 |
| EP | 1 090 492 A1 | 4/2001 |
| EP | 1 091 526 A2 | 4/2001 |
| GB | 2 368 692 A | 5/2002 |
| WO | WO 95/08794 | 3/1995 |
| WO | WO 95/24802 A | 9/1995 |
| WO | WO 98/18235 A | 4/1998 |
| WO | WO 98/24208 | 6/1998 |
| WO | WO 99/01968 | 1/1999 |
| WO | WO 99/11003 | 3/1999 |
| WO | WO 99/67931 | 12/1999 |
| WO | WO 00/04665 | 1/2000 |
| WO | WO 00/41091 | 7/2000 |
| WO | WO 01/01293 A2 | 1/2001 |
| WO | WO 01/19031 A1 | 3/2001 |
| WO | WO 01/47185 A2 | 6/2001 |
| WO | WO 01/47186 A2 | 6/2001 |
| WO | WO 02/47332 A2 | 6/2002 |

OTHER PUBLICATIONS

ISM Customer—Aware™ Query; CoManage Corporation; As of Dec. 5, 2000 (2 pages).

ISM Customer—Aware™ Provisioning; CoManage Corporation; As of Dec. 5, 2000 (2 pages).

ISM Customer—Aware™ Deep Discovery™; CoManage Corporation; As of Dec. 5, 2000 (2 pages).

ISM Customer—Aware™ Service Profiling; CoManage Corporation; As of Dec. 5, 2000 (2 pages).

ISM Customer—Aware™ Fault and Performance Management; CoManage Corporation; As of Dec. 5, 2000 (2 pages).

"FFST/2 Generic Alert Router for LAN and SNA Transports," IBM Technical Disclosure Bulletin, IBM Corp. New York, US, vol. 34, No. 11, Apr. 1, 1992, pp. 467-468, XP000303331, ISSN: 0018-8689.

Torrente S et al: "Implementation of the ANSI TIM1.5 GBM-T1.214 within an ODBMS framework" Networking: Foundation for the Future, San Francisco, Mar. 28-Apr. 1, 1993, Proceedings of the Annual Joint Conference of the Computer and Communications Societies (INFOCOM), Los Alamitos, IEE Comp. Soc. Press, US, vol. 2 CONF. 12, Mar. 28, 1993, pp. 875-884, XP010032227, ISBN :0-8186-3580-0.

Kennedy T W: "Network Operations & Management Tool Requirements for the 90s" Proceedings of the Network Operations and Management Symposium (NOMS). Memphis, Apr. 6-9, 1992, New York, IEEE, U.S. Vo. 1, 1992, pp. 122-132.

Lee, W.C. et al: "Routing Subject to Quality of Service Constraints in Integrated Communication Networks" IEEE Network, IEEE Inc. New York, US, vol. 9, No. 4, Jul. 1, 1995, pp. 46-55, XP000526591, ISSN: 0890-8044 the whole document.

Williams R: "Web Based Enterprise Management W101" DMTF 1999 Annual Conference, 'Online! Jun. 1999, pp. 1-21.

Wolfson, Ouri et al.: "Managing Communication Networks by Monitoring Databases", IEEE Transactions on Software Engineering, IEEE Inc. New York, US, vol. 17, No. 9 Sep. 1, 1991, pp. 944-953.

PCT/US 01/45668—International Search Report dated Oct. 16, 2002.

PCT/US 01/45669—International Search Report dated Oct. 16, 2002.

PCT/US 01/45671—International Search Report dated Oct. 16, 2002.

PCT/US 01/45670—International Search Report dated Dec. 20, 2002.

PCT/US 01/45672—International Search Report dated Apr. 14, 2003.

PCT/US 01/45671—Written Opinion dated Dec. 13, 2002.

Strassner, John; Technology Series—*Directory Enabled Networks*, 1999; MacMillan Technical Publishing USA.

Lonvick, C. The BSD syslog Protocol. RFC 3164 [online], Aug. 2001 [retrieved on Mar. 25, 2002]. Retrieved from the Internet ,<url: HTTP://www.ietf.org/rfc/rfc3164.txt>.

Case, J., A Simple Network Management Protocol (SNMP). RFC 1098 [online], Apr. 1989 [retrieved on Mar. 26, 2002]. Retrieved from the internet <URL: http://www.ietf.org/rfc/rfc1098.txt?number=1098>.

Postel, J.B. Simple Mail Transfer Protocol. RFC 821 [online], Aug. 1982 [retrieved on Mar. 26, 2002]. Retrieved from the Internet <URL: http:///www.ietf.org/rfc/rfc0821.txt?number=821>.

Finseth, C. An Access Control Protocol, Sometimes called TACACS. RFC 1492 [online], Jul. 1993 [retrieved on Mar. 25, 2002]. Retrieved from the Internet <URL: http://www.cis.ohio-state.edu/cgi-bin/rfc/rfc1492.html>.

Anderson B.A. TACACS User Identification Telnet Option. RFC 927 [online], Dec. 1984 [retrieved on Mar. 25, 2002]. Retrieved from the Internet <URL: http://www.ietf.org/rfc/rfc0927.txt.>.

Rigney, C., et al. Remote Authentication Dial In User Service (RADIUS). RFC 2138 [online], Apr. 1997 {retrieved on Mar. 25, 2002]. Retrieved from the Internet <URL: http://www.ietf.org/rfc/rfc2138.txt.>.

Rigney, C., Radius Accounting. RFC 2139 [Online], Apr. 1997 [retrieved on Mar. 25, 2002]. Retrieved from the Internet <URL: http://www.ietf.org/rfc/rfc2139.txt>.

Postel, J., and Reynolds, J. Telnet Protocol Specification. RFC 854 [online], May 1983 [retrieved on Mar. 25, 2002]. Retrieved from the Internet <URL: http://www.ietf.org/rfc/rfc0854.txt>.

Gold Wire Technology, "Tracking Changes." In *Formulator 1.0 User Guide*, pp. 211-224, 2001.

Lewis, L., "Policy-Based Configuration Management: A Perspective from a Network Management Vendor," http://www.simple-times.org/pub/simple-times/issues/8-1.html., pp. 7-27, 2001.

Waldbusser, St., et al., "Policy Based Management MIB," http://www.ietf.org/internet-drafts/draft-ietf-snmpconf-pm-05.txt, pp. 1-102, 2001.

Strassner, J., *A New Paradigm for Network Management: Business Deriven Device Management*,[online], 2002, http://www.ssgrr.it/en/ssgrr2002s/papers.htm, http://www.ssgrr.it/en/ssgrr2002s/papers/162.pdf.

* cited by examiner

SYSTEM AND METHOD FOR MODELING A NETWORK DEVICE'S CONFIGURATION

RELATED APPLICATIONS

The present application is related to commonly owned and assigned application nos.:

Ser. No. 09/730,864 entitled *System and Method for Configuration, Management and Monitoring of Network Resources*, filed Dec. 6, 2000;

Ser. No. 09/730,680 entitled *System and Method for Redirecting Data Generated by Network Devices*, filed Dec. 6, 2000;

Ser. No. 09/730,863 entitled *Event Manager for Network Operating System*, filed Dec. 6, 2000;

Ser. No. 09/730,671 entitled *Dynamic Configuration of Network Devices to Enable Data Transfers*, filed Dec. 6, 2000;

Ser. No. 09/730,682 entitled *Network Operating System Data Directory*, filed Dec. 6, 2000; and Ser. No. 09/799,579 entitled *Global GUI Interface for Network OS*, filed Mar. 6, 2001;

all of which are incorporated herein by reference.

FIELD OF THE INVENTION

The present invention relates to network device configuration. In particular, but not by way of limitation, the present invention relates to systems and methods for retrieving configurations from network devices and generating corresponding command models.

BACKGROUND OF THE INVENTION

Networks, and in particular, the Internet, have revolutionized communications. Data vital to the continued prosperity of the world economy is constantly being exchanged between end-users over these networks. Unfortunately, the expansion and maintenance of present networks is outpaced by the demand for additional bandwidth. Network equipment is often difficult to configure, and qualified network engineers are in extremely short supply. Thus, many needed network expansions and upgrades must be delayed until these engineers are available. While these upgrades and expansions are pending, end-users continue to suffer poor network performance.

Cisco™ routers, for example, are notoriously difficult to configure—especially in light of the new XML-based interfaces introduced by competitors such as Juniper Networks™. Instead of a user-friendly XML-based interface, Cisco™ uses a cumbersome command line interface (CLI) for its routers. Cisco's™ CLI is the result of many years of semi-controlled modifications to its router operating systems and has resulted in a tangled mess of commands and subcommands. This cumbersome interface is one reason that Cisco™ requires that Cisco-certified engineers work on its routers.

Cisco™ could reduce the complexity of its routers and reduce the need for Cisco-certified engineers by producing a user-friendly interface. If Cisco™ attempted to abandon its CLI in favor of such a user-friendly interface, however, many years of development and expertise could be lost. Moreover, even if it could develop a user-friendly interface, there is presently no economical way to integrate it into the thousands of existing Cisco™ routers. Despite the difficulties in implementing a more user-friendly interface, to remain competitive, Cisco™ and similarly situated companies need to move away from their present interfaces. Present technology, however, does not provide these companies with an acceptable option that allows continued use of their extensive interface knowledge base while simultaneously providing system administrators and network engineers with a user-friendly interface. Moreover, present technologies do not provide an acceptable way to provide backward compatibility of new user-friendly interfaces with existing network devices.

Cisco™, of course, is not the only network device manufacturer to face this interface-upgrade problem. Many manufacturers would like to continue using their existing interface knowledge base while providing system administrators a user-friendly, consistent interface. Accordingly, a system and method are needed that will allow manufacturers, like Cisco™, to create user-friendly interfaces for both next-generation and existing devices.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

In one embodiment, for example, the present invention can provide a system and method for modeling the configuration of a network device. Such a system could include a CLI-to-XML converter connected to a schema storage device or a CLI-to-XML converter in combination with a document object model (DOM) generator. Other embodiments could include, for example, a CLI-to-XML converter, a schema hash system, and a DOM generator.

In operation, one embodiment of the present invention can model a network device's configuration by retrieving a the network device's configuration, in a native format, from the network device—or an alternate location—and converting it into a standard-format configuration such as an XML document or a DOM. This standard-format configuration provides system administrators with an easy-to-use, familiar device configuration format for different network devices. That is, instead of being forced to manipulate a difficult CLI-based configuration format, or other format system administrators can use the standard-format configuration to interact with the target network device. Moreover, one embodiment of the present invention can allow system administrators to use the same standard configuration format across multiple brands and models of network devices. Thus, in networks that employ multiple brands and models of network devices, system administrators can be presented with similar configuration formats for each device despite the fact that the native configuration formats for the different devices are significantly different.

The process for actually converting a native-format configuration for a network device into a standard-format configuration is generally a multi-step process. For example, one embodiment of the present invention initially determines the target network device's characteristics such as manufacturer, model, operating system version, etc. Next, using some or all of this characteristic information, an appropriate configuration schema can be retrieved from a schema storage device. Briefly, the schema can include a standard representation of the command structure for a particular type of network device. For example, one schema could contain a representation of the command structure for all model 7500 Cisco™ routers using OS version 12.1, and another schema could contain a representation of the command structure routers using OS version 12.2. The schema, its creation, and its use are fully described in commonly owned and assigned U.S. patent application No. 09/942,834, entitled *System and Method for Generating a Configuration Schema*, which is incorporated herein by reference.

In certain embodiments, this schema can be directly used to generate an XML document that represents the configuration of the particular network device. In the presently preferred embodiment, however, an intermediate representation, e.g., a hash representation, of the schema is generated and the intermediate representation is used to more quickly generate the corresponding XML document. By using the intermediate representation, the number of instruction cycles needed to generate the XML document is reduced significantly when compared to generating the XML document directly.

To actually assemble an XML document, one embodiment of the present invention generates an XML representation of each native-format command in the network device's configuration by associating each command with the schema, or its hash representation. The XML document itself can be used to represent the standard-format configuration, or alternatively, the XML document can be converted into a DOM, and the DOM can represent the standard-format configuration. Notably, the integrity of the generated DOM can be verified via the schema that was used to generate the XML document, thereby providing a "closed-loop" capability.

As previously stated, the above-described embodiments and implementations are for illustration purposes only. Numerous other embodiments, implementations, and details of the invention are easily recognized by those of skill in the art from the following descriptions and claims.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein:

DETAILED DESCRIPTION

Figure 1:
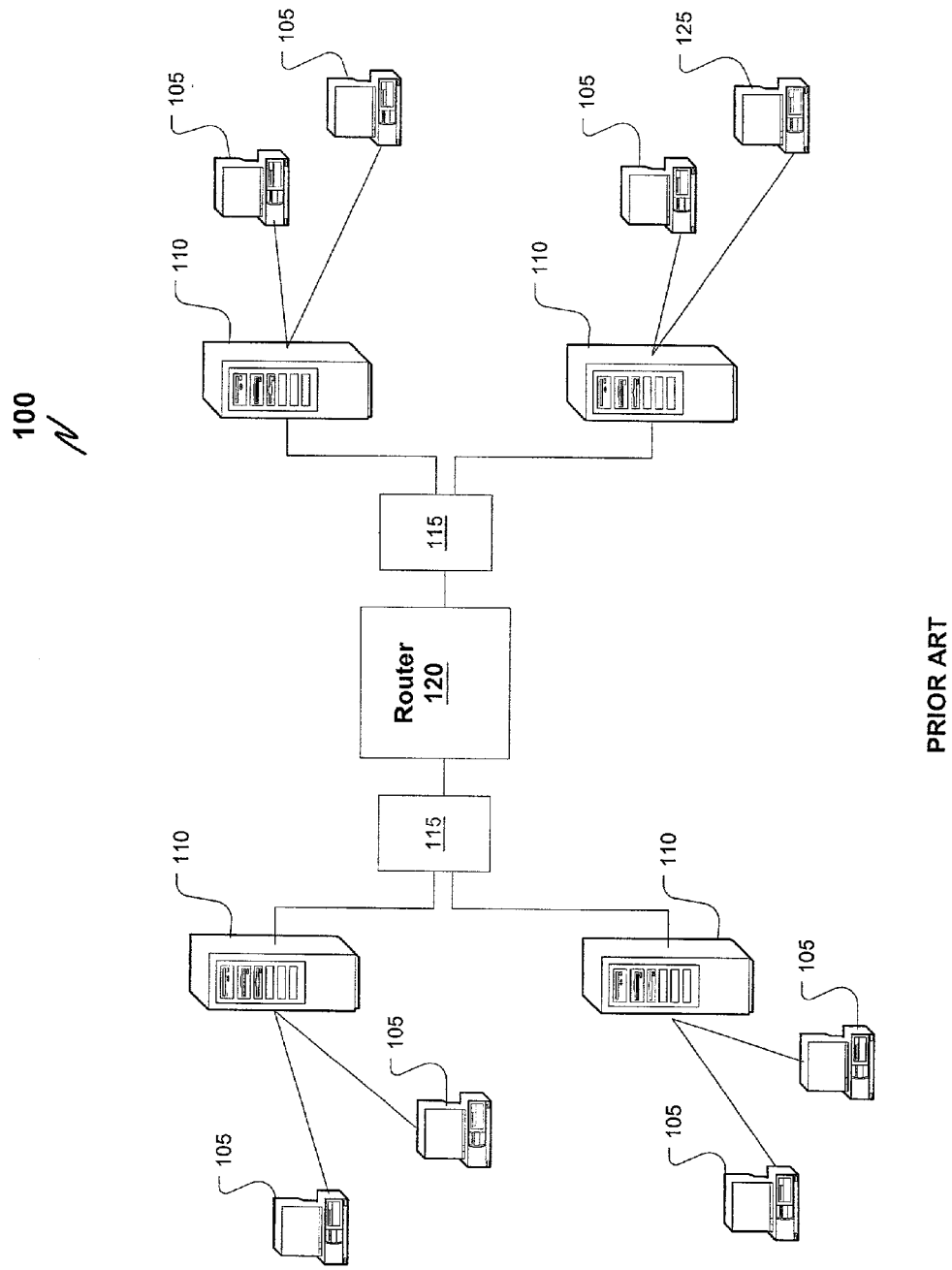
FIG. 1 is a block diagram of a conventional network.

Referring now to the drawings, where like or similar elements are designated with identical reference numerals throughout the several views, and referring in particular to FIG. 1, it illustrates a block diagram of a conventional network system 100. In this network system 100, end-users 105 are connected to servers 110, which are connected to networking equipment such as hubs, not shown, optical components 115, and routers 120. Using the networking equipment, end-users 105 that are associated with different servers 110 can exchange data.

As new servers 110 and end-users 105 are added to the overall system 100, or as new software becomes available, the routers 120 and/or optical components 115 of the network system 100 may need reconfiguring. To reconfigure these components, a system administrator 125—with the proper authorization—could access the router 120 and/or optical component 115 by, for example, establishing a telnet connection to the component and transferring configuration instructions thereto.

Figure 2:
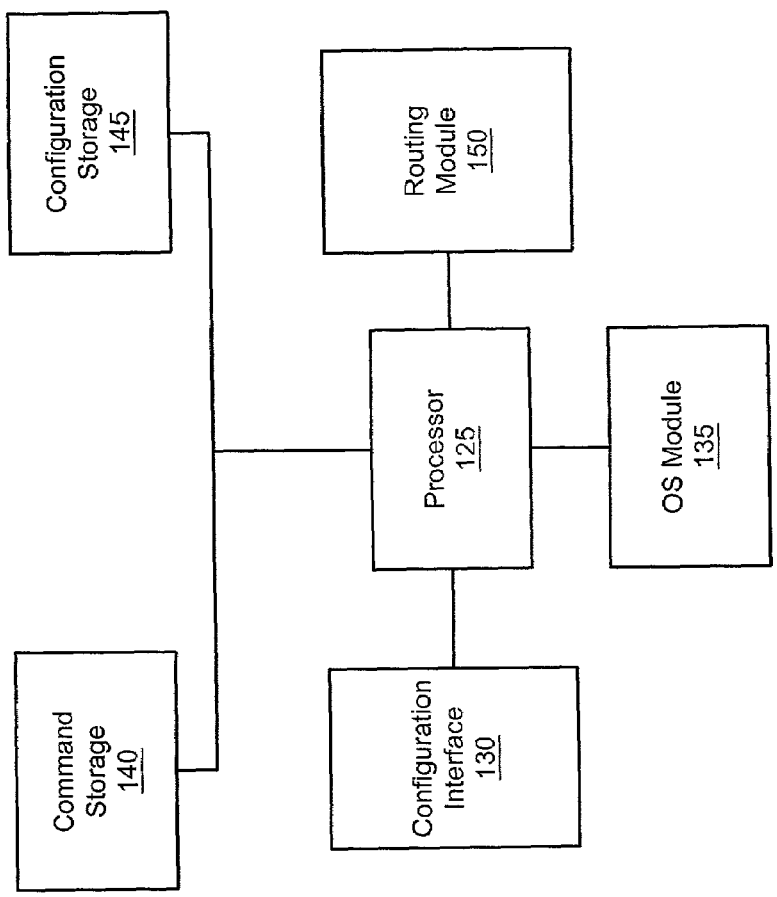
FIG. 2 is a block diagram of a conventional router.

Referring now to FIG. 2, it is a block diagram of one type of conventional router. In this representation, a processor 125 is connected to a configuration interface 130, an operating system (OS) storage module 135, a command storage module 140, a configuration storage module 145, and a routing module 150. The illustrated arrangement of these components is logical and not meant to be an actual hardware diagram. Thus, the components can be combined or further separated in an actual implementation. Moreover, the construction of each individual component is well-known to those of skill in the art.

Still referring to FIG. 2, when a system administrator 125 wishes to reconfigure a router 120, he accesses the router 120 through the configuration interface 130 and retrieves the present configuration for the router 120 from the configuration storage module 145. If necessary, the system administrator 125 can review available configuration commands and associated bounds by accessing and reviewing the commands stored in the command storage module 140. In essence, the command storage module 140 provides the knowledge base for a "help" screen. The commands stored in the command storage module 140 are often unique to the particular OS version stored in the OS module 135.

After the system administrator 125 has assembled the new configuration instructions, these instructions are pushed through the configuration interface 130 and stored in the configuration storage module 145. As previously described, for Cisco™ routers, interaction is generally through a CLI. In other words, the command storage module 140 is queried through the CLI; available commands are returned through the CLI; and new configuration commands are provided to the router 120 through the CLI. Unfortunately, the CLI is difficult to manage and requires highly skilled engineers for even simple tasks.

For other routers, the configuration interface 130 could be XML based. Although the XML-based interface is easier to navigate than a CLI, each network device manufacturer that uses an XML-based interface generally structures its interface in a proprietary fashion. Thus, network engineers are still forced to learn many different interfaces and command structures even for XML-based network devices.

Figure 3:
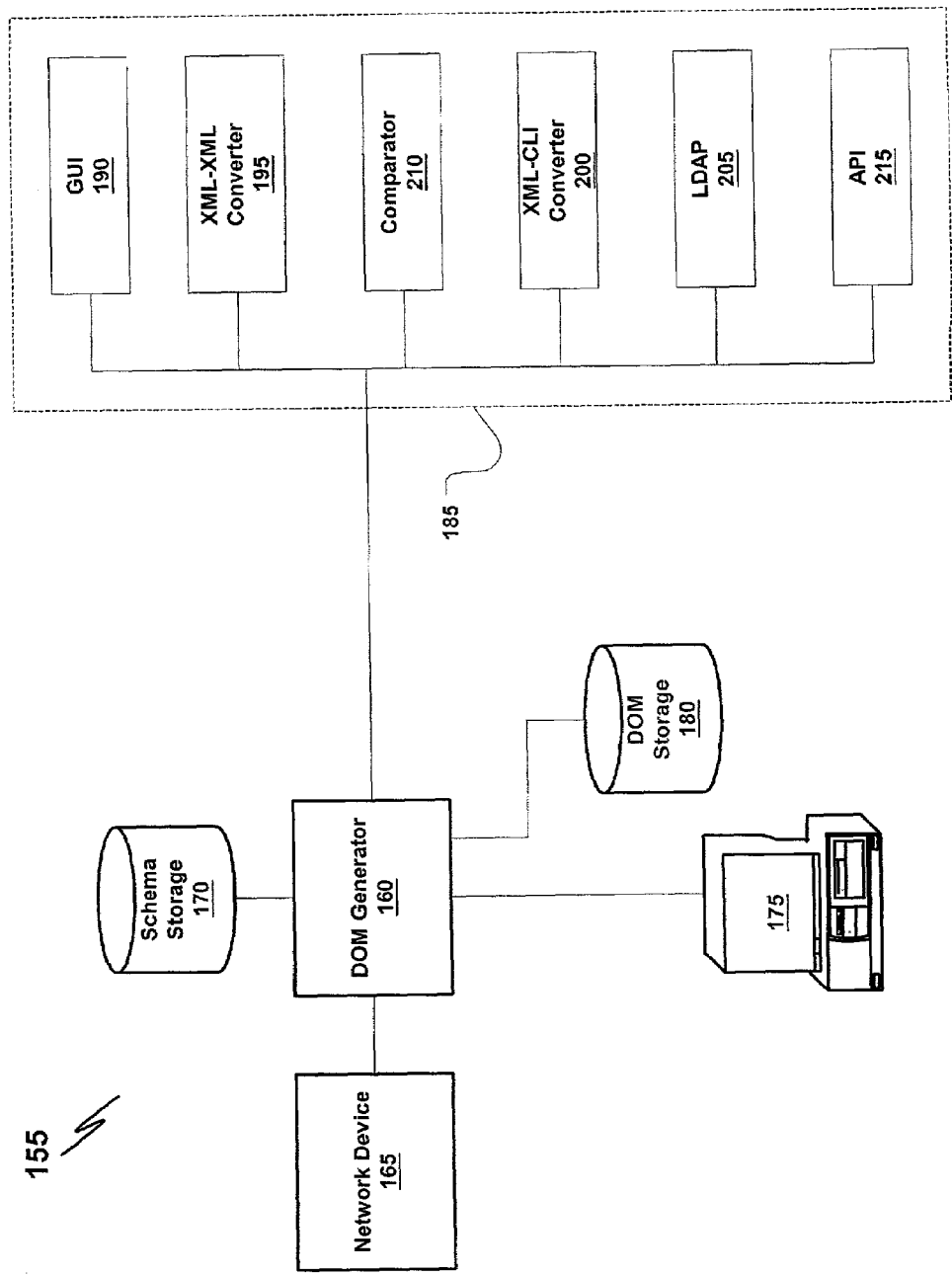
FIG. 3 is a block diagram of one embodiment of a system constructed in accordance with the principles of the present invention.
Figure 5:
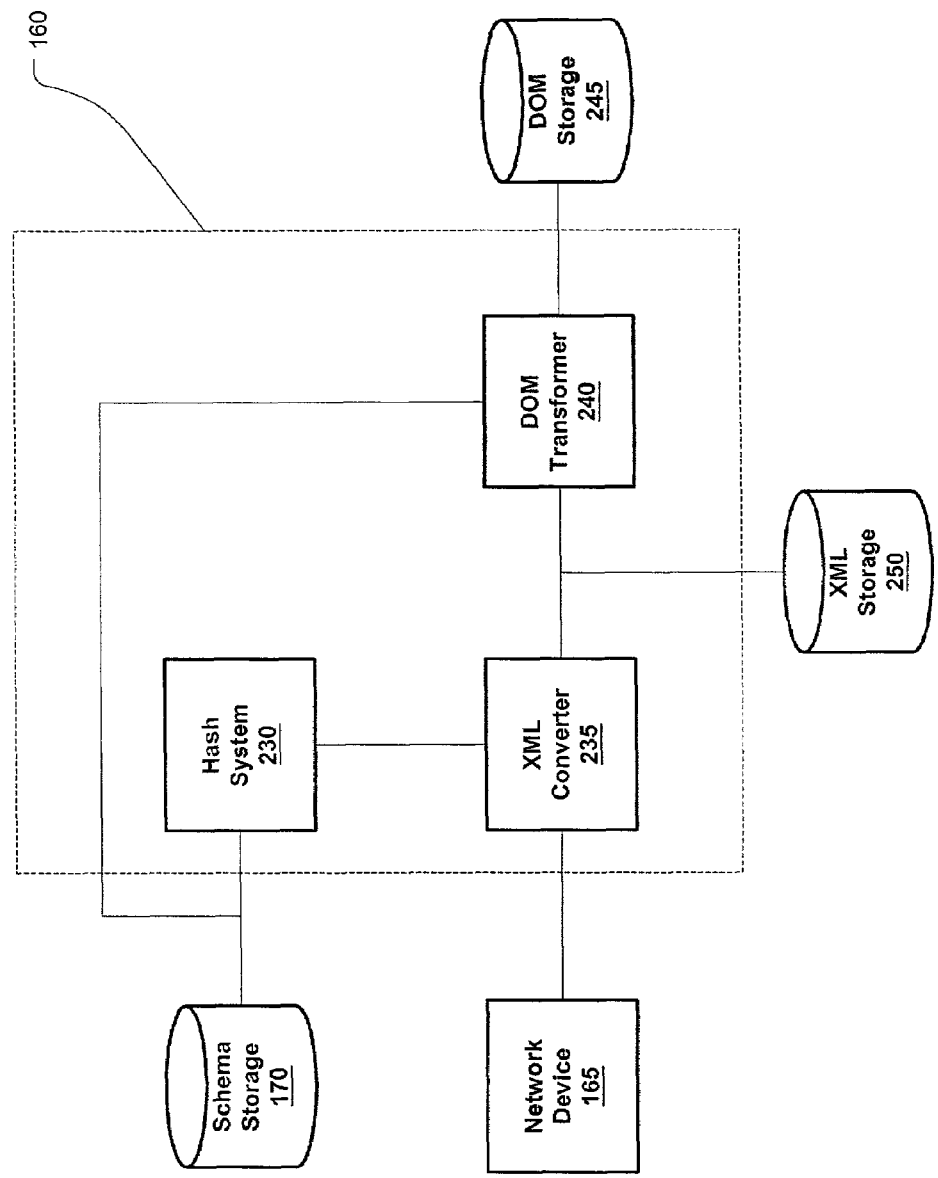
FIG. 5 is a block diagram of one implementation of the DOM generator shown in FIG. 3.

Referring now to FIG. 3, it is a block diagram of one embodiment of a system constructed in accordance with the principles of the present invention. In this embodiment, a DOM generator 160, which is more fully described with relation to FIG. 5, is connected to a network device 165, a schema storage device 170, a system administrator 175, a DOM storage device 180, and various DOM applications 185, which will be discussed in more detail below.

In one method of operation, the system administrator 175 initially notifies the DOM generator 160 to model the configuration for the network device 165. In other words, the DOM generator 160 is instructed to convert the active command format for the network device 165 into an XML and/or DOM format. In response, the DOM generator 160 either polls the network device 165 to discover the device's characteristics, e.g., manufacturer, model, operating system version, etc., or retrieves the information from a database (not shown). Next, the DOM generator 160 identifies and retrieves, from the schema storage device 170, the schema corresponding to the device characteristics for the network device 165. The DOM generator 160 then retrieves the configuration from the network device 165 and, using the retrieved schema, converts the individual commands of the configuration into a DOM. The resulting DOM can then be stored in the DOM storage device 180 in association with an identifier for the network device 165. Note that storage devices 170 and 180 could, in fact, be integrated into a single device.

One advantage of the DOM format is that it provides a standard format for most network device configurations. Generally, applications that use or manipulate network device configurations must be customized for each manufacturer, each model, and each OS version. This type of customization often requires many different versions of the same application. By converting each network device's configuration into a DOM format, however, applications can be designed to utilize a single, standard configuration format and thereby limit the need for customizations.

Although many different types of applications can utilize a DOM, a select few are represented in FIG. 3 as DOM applications. For example, one such application is a DOM-based graphical user interface (GUI) 190. In this application, the hashed schema and/or the resulting DOM instance are used to drive the GUI used by the system administrator 175. The advantage of such a GUI 190 is that the system administrator 175 is presented with network device configurations in a standard, consistent format regardless of the characteristics of the particular network device.

Another application that utilizes the DOM is the XML-XML converter 195, also called the standard XML-to-native XML converter. As previously described, some network devices include XML-based interfaces. However, these XML-based interfaces are generally based on proprietary (native) configuration instructions. Thus, the system administrator 175 may interface with one XML-based network device in a very different way than another XML-based network device. To standardize the interface between these various XML-based network devices, the XML-XML converter converts a standard XML-based instruction into a native XML-based instruction. In other words, the XML-XML converter allows the system administrator 175 to use the same XML-based command format for most network devices even though each device may require its own native XML-based command format.

Like the XML-XML converter 195, the XML-CLI converter 200 allows the system administrator 175 to interface with CLI-based network devices using a standard XML-based command format instead of a CLI-based command format. Other DOM-based applications may include lightweight directory access protocol (LDAP) for storing and manipulating schema, hash representations, and device configuration commands. These converters convert XML-based configurations into a LDAP-based configuration and LDAP-based configurations into XML-based configurations.

Yet another possible DOM application is the comparator 210, which is configurable to identify the differences between two DOMs. For example, if the configuration for a target network device were changed, the new configuration could be retrieved from the device and converted to a DOM. The comparator 210 could then compare the new DOM against the original DOM to thereby identify any changes, additions, and/or deletions. The comparator can then record these changes in a markup DOM using a configuration change markup language and make the markup DOM available to the system administrator for configuration and validation purposes.

In another embodiment of the comparator 210, the old DOM is compared against a draft DOM instead of a new DOM. In other words, the system administrator 175 generates a draft configuration for a target network device 165. This draft configuration is converted into a DOM, and the comparator 210 compares it against the target network device's original DOM. The system administrator 175 can use this embodiment of the comparator to view the configuration changes before the draft DOM is finalized and pushed to the target network device 165.

The DOM applications can also include an (API) application programming interface 215. This API provides a mechanism whereby the DOM can be transferred to/from other software programs, which may reside on network devices. Accordingly, the DOM can be programmatically modified outside of the embodiment and resubmitted.

Figure 4:
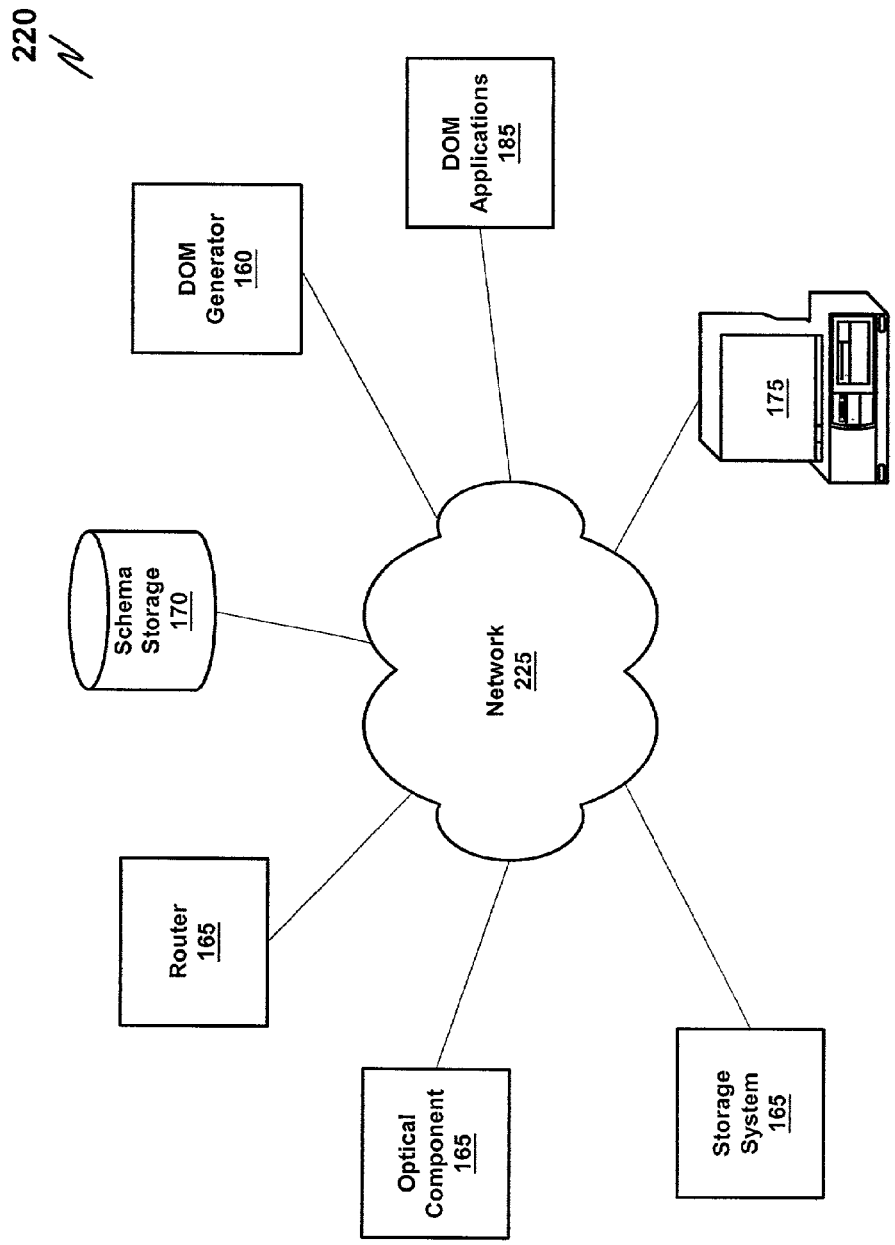
FIG. 4 is a block diagram of an alternate embodiment of a system constructed in accordance with the principles of the present invention.

Referring now to FIG. 4, it is a block diagram of an alternate embodiment of a system 220 constructed in accordance with the principles of the present invention. In this embodiment, the DOM generator 160 is connected through a network 225 to the network devices 165, the system administrator 175, the schema storage device 170, and the DOM applications 180. This embodiment illustrates that the components described herein can be distributed in a number of ways and without impacting the basic operation of this system as described with regard to FIG. 3.

Referring now to FIG. 5, it is a block diagram of one implementation of the DOM generator 160 shown in FIG. 3. In this embodiment, the DOM generator 160 includes a schema hash system 230, an XML converter 235, and a DOM transformer 250. These components can be connected to the schema storage device 170, the target network device 165, a DOM storage device 245 and an XML storage device 250.

In this embodiment, the XML converter 235, using the appropriate schema, generates an XML document containing an XML representation of the network device's configuration. This XML document is then passed to the DOM transformer 240, which converts the XML document into a DOM. The output from the XML converter 235 and/or the DOM transformer 240 can be stored and passed to relevant software applications. For example, the output from the XML converter 235 can be stored in the XML storage device 250 and the output from the DOM transformer 240 can be stored in the DOM storage device 245.

Notably, the XML converter 235 of this embodiment can convert the native configuration of the network device 165 into an XML document using an intermediate representation of the schema associated with the network device 165, such as a hash table generated by the hash system 230, instead of the schema itself. By using an intermediate representation of the appropriate schema, the XML converter 235 can reduce the time and processing requirements needed to convert a native configuration into a corresponding XML document. The creation and use of the intermediate representation is described more fully with regard to FIG. 6.

Figure 6:
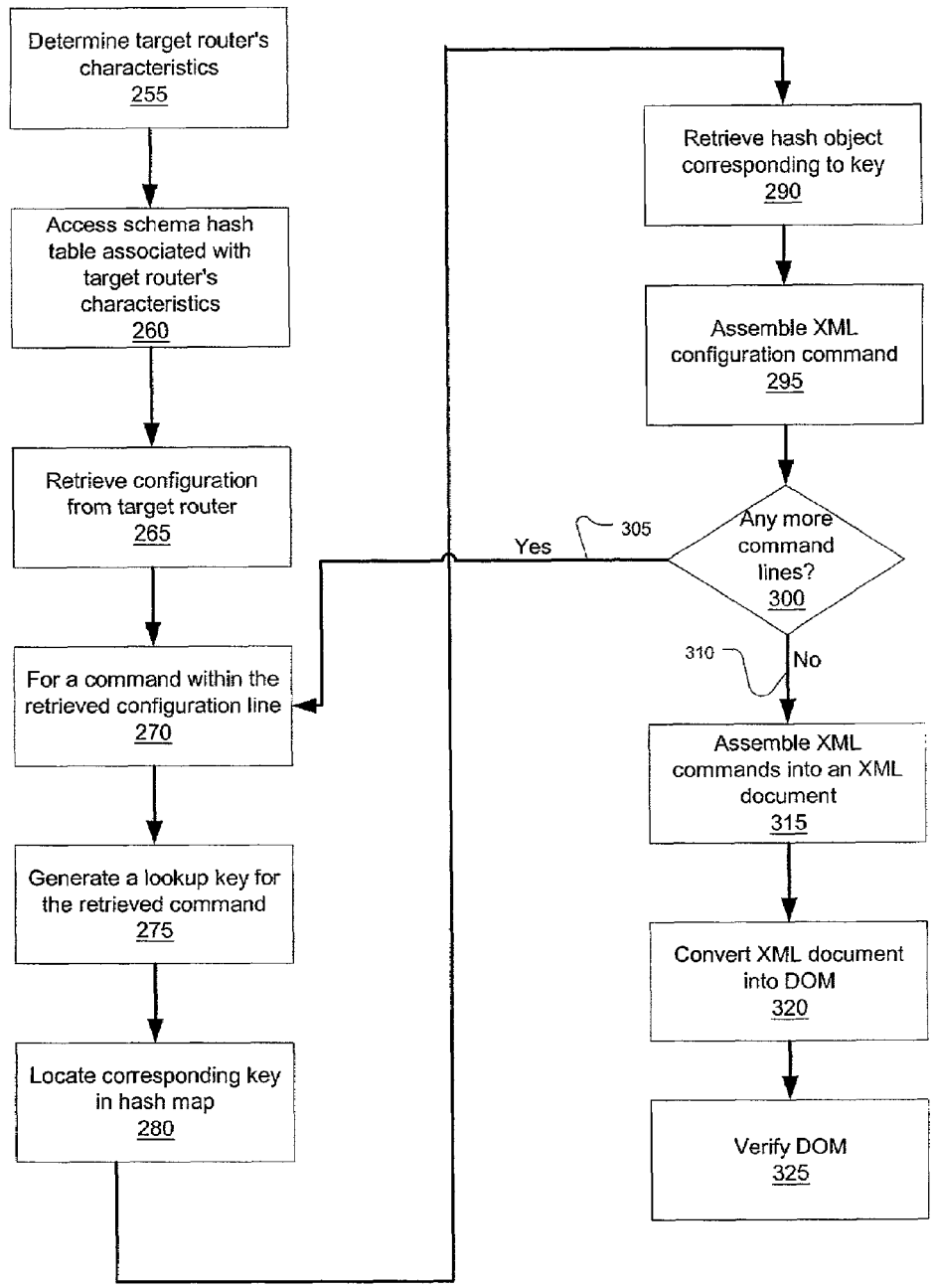
FIG. 6 is a flowchart of one method for operating the DOM generator shown in FIG. 5.

The operation of the DOM generator 160 can be further illustrated by reference to the flowchart in FIG. 6. As depicted, the DOM generator 160 determines the target network device's characteristics by polling the network device or accessing a database (not shown) containing such information (step 255). Next, the XML converter 235 identifies the appropriate intermediate representation for the target network device 165 (step 260). As previously described, this intermediate representation provides the necessary data to convert the native-format configuration of the target network device 165 into a standard format such as an XML format.

Possibly concurrently with the XML converter 235 identifying the corresponding intermediate representation, the XML converter 235 retrieves the configuration from the network device 165 and identifies each initial command within each configuration line (steps 265 and 270). For example, the XML converter 235 could locate command distinguishing tags embedded in the configuration such as "begin command" and/or "end command." Alternatively, the XML converter 235 could use logical indicators within the configuration to distinguish the individual commands. Either way, using the identified initial command, the XML converter 235 generates a look-up key that is used to index the hash table, locate a hash map object that corresponds to the look-up key and retrieve that hash map object (steps 275 and 280). The hash map object contains schema information regarding the command or value such as whether optional or required data type, etc. Finally, using this hash map object, the XML converter 235 can assemble the XML-based command and write it to the corresponding XML document (step 295).

The above process should be repeated for each command in the network device's native-format configuration. With regard to FIG. 6, this process is represented by determining whether any more commands need to be converted (step 300). If so, branch 305 is followed to step 270 and a next native-format command is identified. The process for this command is then repeated. If, on the other hand, all native-format commands have been converted, branch 310 is followed and the XML converter 235 assembles all of the generated XML commands into an XML document that can be stored in the XML storage device and/or provided to the DOM transformer 240 (step 315).

Once the XML document has been assembled, it can be passed to the DOM transformer 240 where a DOM corresponding to the XML document can be generated (step 320). The process for converting an XML document to a DOM is well known in the art and, thus, not described here. Notably, the DOM transformer 240 can verify its transformation process against the appropriate schema stored in the schema storage device 170 (step 325). In other words, each configuration command in the DOM should have a particular format, which are defined by the configuration schema corresponding to the target network device 165. Thus, the DOM transformer 240 can compare the generated DOM against the corresponding configuration schema to verify that the DOM was properly constructed.

Figure 7:
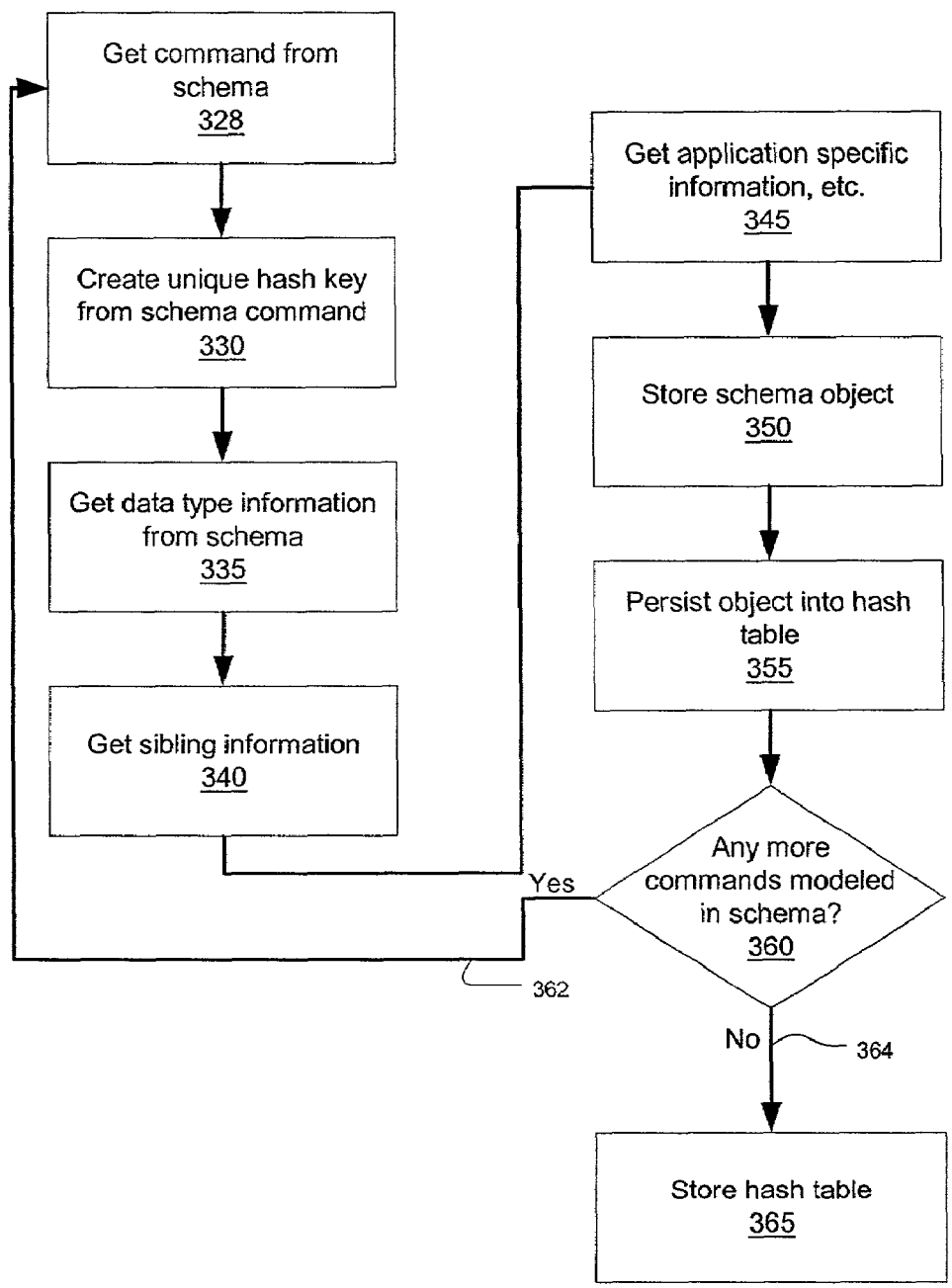
FIG. 7 is a flowchart of one method for generating an intermediate representation described with relation to FIG. 6.

Referring now to FIG. 7, it is a flowchart of one method for generating an intermediate representation of a configuration schema. In this embodiment, a command is initially retrieved from the previously assembled configuration schema (step 328). Additionally, any related higher-level commands (called parent commands) in the configuration schema can be retrieved (step 330). The retrieved command and the retrieved parent commands can then be used to generate a unique hash key for the retrieved command (step 330).

After the unique hash key is generated, a corresponding hash object can also be generated. This hash object can include basic information related to the generated hash key. To generate the hash object, information such as data type, sibling commands, and application specific information is retrieved and assembled into the schema object (steps 335 and 340). The data type information, for example, can indicate whether the data associated with a particular command is a string, an integer, etc. and the sibling information can identify commands at the same hierarchical level as the initially retrieved command that have the same parent command as the initially retrieved command. Additionally, in certain embodiments, specialized application information can also be retrieved (step 345). This application information, for example, can define special processing requirements for a schema.

Once the relevant information has been collected, the corresponding schema object can be assembled and the hash map assembled for the unique key and schema object (step 350 and 355). If there are any more commands in the schema that need to be modeled, branch 362 is followed and the next command can be retrieved (step 328). If all of the commands have been modeled, then branch 364 can be followed and the various hash objects can be stored as a completed hash table (step 365).

What is claimed is:

1. A method for modeling a configuration corresponding to a network device, wherein the configuration includes a plurality of configuration commands, the method comprising:

determining a characteristic of the network device, wherein determining the characteristic of the network device comprises determining one of a network device manufacturer, network device model, and network device operating system version;

retrieving a representation of a configuration schema, the representation of a configuration schema corresponding to the determined characteristic of the network device, wherein the representation of the configuration schema comprises a plurality of schema portions and wherein retrieving the representation of the configuration schema comprises:

retrieving an intermediate representation of the configuration schema, wherein the intermediate representation comprises a plurality of keys; wherein each of the plurality of keys is associated with a corresponding one of the plurality of schema portions; and retrieving a first of the plurality of configuration commands from the network device configuration corresponding to the network device; and generating an XML object corresponding to the retrieved configuration command;

wherein the XML object is generated according to at least a portion of the retrieved representation of the configuration schema.

2. The method of claim 1, wherein retrieving the intermediate representation of the configuration schema comprises:

retrieving a hash table.

3. The method of claim 1, further comprising:

generating a look-up key for the retrieved configuration command.

4. The method of claim 3, further comprising:
identifying a first of the plurality of keys in the intermediate representation, the first of the plurality of keys corresponding to the generated look-up key; and
retrieving a first of the plurality of schema portions, the first of the plurality of schema portions corresponding to the first of the plurality of keys;
wherein the XML object is generated according to the first of the plurality of schema portions.

5. The method of claim 1, further comprising:
converting the XML object to an XML document.

6. The method of claim 5, further comprising:
converting the XML document into a document object model (DOM).

7. The method of claim 6, further comprising:
verifying the DOM against the at least the representation of the configuration schema.

8. A method for modeling a configuration corresponding to a network device, wherein the configuration includes a plurality of configuration commands, the method comprising:
determining a characteristic of the network device, wherein determining the characteristic of the network device comprises determining one of a network device manufacturer, network device model, and network device operating system version;
retrieving a representation of a configuration schema, the representation of a configuration schema corresponding to the determined characteristic of the network device, wherein the representation of the configuration schema comprises a plurality of schema portions and wherein retrieving the representation of the configuration schema comprises:
retrieving an intermediate representation of the configuration schema, wherein the intermediate representation comprises a plurality of keys; wherein each of the plurality of keys is associated with a corresponding one of the plurality of schema portions; and
retrieving a first of the plurality of configuration commands from the network device configuration corresponding to the network device; and
generating a standard-format representation of the retrieved configuration command; wherein the standard-format representation is generated according to at least a portion of the retrieved representation of the configuration schema.

9. The method of claim 8, further comprising:
generating a look-up key for the retrieved configuration command.

10. The method of claim 9, further comprising:
identifying a first of the plurality of keys in the intermediate representation, the first of the plurality of keys corresponding to the generated look-up key; and
retrieving a first of the plurality of schema portions, the first of the plurality of schema portions corresponding to the first of the plurality of keys; wherein the standard-format representation is generated according to the first of the plurality of schema portions.

11. The method of claim 8, wherein the standard-format representation comprises an XML object.

12. A system for modeling a configuration corresponding to a network device, wherein the configuration includes a plurality of configuration commands, the system comprising:
a processor;
a storage device connected to the processor; and
a plurality of instructions stored on the storage device, the plurality of instructions configured to cause the processor to:
determine a characteristic of the network device, wherein the instructions configured to determine the characteristic of the network device comprise instructions configured to determine one of a network device manufacturer, network device model, and network device operating system version;
retrieve representation of a configuration schema, the representation of a configuration schema corresponding to the determined characteristic of the network device, wherein the representation of the configuration schema comprises a plurality of schema portions and wherein the plurality of instructions to retrieve the representation of the configuration schema include instructions to:
retrieve an intermediate representation of the configuration schema, wherein the intermediate representation comprises a plurality of keys; wherein each of the plurality of keys is associated with a corresponding one of the plurality of schema portions; and
retrieve a first of the plurality of configuration commands from the network device configuration corresponding to the network device; and generate a standard-format representation of the retrieved configuration command; wherein the standard-format representation is generated according to at least a portion of the retrieved representation of the configuration schema.

13. The system of claim 12, wherein the plurality of instructions are further configured to cause the processor to:
generate a look-up key for the retrieved configuration command.

14. The system of claim 13, wherein the plurality of instructions are further configured to cause the processor to:
identify a first of the plurality of keys in the intermediate representation, the first of the plurality of keys corresponding to the generated look-up key;
and retrieve a first of the plurality of schema portions, the first of the plurality of schema portions corresponding to the first of the plurality of keys; wherein the standard-format representation is generated according to the first of the plurality of schema portions.

15. The system of claim 13, wherein the plurality of instructions are further configured to cause the processor to:
convert the XML object to an XML document.

16. The system of claim 15, wherein the plurality of instructions are further configured to cause the processor to:
convert the XML document into a document object model (DOM).

17. The system of claim 16, wherein the plurality of instructions are further configured to cause the processor to:
verify the DOM against the at least the representation of the configuration schema.

18. The system of claim 12, wherein the standard-format representation comprises an XML object.

* * * * *